Fig. 7. Blower Fan Switch Operating Positions

| Position | Circuits Closed | | | | |
|---|---|---|---|---|---|
| | 1 | 2 | 3 | 4 | 5 |
| Off | | | | ● | |
| On | ● | ● | ● | | ● |

Fig. 8. Air Conditioning Control Switch Operating Positions

| Position | Circuits Closed | | | | | | | | | | |
|---|---|---|---|---|---|---|---|---|---|---|---|
| | 6 | 7 | 8 | 9 | 10 | 11 | 12 | 13 | 14 | 15 | 16 |
| Heating High | | | | ● | | | ● | | | | ● |
| Heating Med | | | | ● | | ● | | | | ● | |
| Heating Low | | | | ● | ● | | | | ● | | |
| Off | | | | | | | ● | | ● | ● | |
| Cooling Low | ● | | | | | | | ● | | | |
| Cooling Med | | ● | | | | | | ● | | | |
| Cooling High | | | ● | | | | | ● | | | |

Inventors
Paul B. Parks
and Timothy J. Lehane
Barnett & Truman
Attorneys.

UNITED STATES PATENT OFFICE 2,323,236

TEMPERATURE REGULATING AND VENTILATING SYSTEM

Paul B. Parks, Oak Park, and Timothy J. Lehane, Chicago, Ill., assignors to Vapor Car Heating Company, Inc., Chicago, Ill., a corporation of New York Application July 5, 1940, Serial No. 344,122

10 Claims. (Cl. 257—3)

This invention relates to certain new and useful improvements in a temperature regulating and ventilating system, especially designed for a railway passenger car comprising a plurality of separate compartments, although it will become apparent as the disclosure progresses that the invention is, to a large extent, also applicable for ventilating and regulating the temperature of other types of enclosures.

The invention comprises a modified vapor or steam heating and air-conditioning system, comprising somewhat different types of cooperating heating devices, the principal object of the invention being the coordination of all of the controls of the different heating and air-conditioning units so as to solve the various problems encountered. Briefly, the apparatus includes an air-conditioning system comprising means for circulating and distributing air through the several different compartments or spaces and means for heating or cooling this circulated air to different selected temperatures. In addition, each of these compartments or spaces is provided with individual heating means so that the compartments may be separately heated, simultaneously, to individually selected temperatures to suit the needs or desires of the occupants of the different compartments. All parts of this system are under the control of an electrically actuated system comprising automatically operating thermostatically controlled means for maintaining selected temperatures at the different locations. The air-conditioning and ventilating systems are primarily controlled, through said electrical control system, by a pair of cooperating manually actuated switches, one a blower or fan switch movable between "on" and "off" positions, and the other being an air-conditioning switch movable in opposite directions from an "off" position to several different selected heating or cooling positions. Each of these primary manually operated switches includes a plurality of different switch contacts in the electric system which cooperate to bring about the numerous controls hereinafter disclosed. There are also individual manual controllers in each of the compartments for selecting the temperature to be maintained at these different locations.

The principal object of this invention is to provide an improved air-conditioning, heating and ventilating system of the type briefly referred to hereinabove, and disclosed more in detail in the drawings and description.

Another object is to provide heating means comprising individual radiators for each of the several compartments, together with means for separately thermostatically controlling the flow of steam or other heating medium to each of the radiators, and alternative means for simultaneously thermostatically controlling the flow of heating medium to all of the radiators to maintain a common minimum temperature in all of the spaces.

Another object is to provide means for cooling all of the spaces to a selected temperature, and simultaneously rendering the heating means ineffective.

Another object is to provide means for permitting the manual control of a portion of the heating means to maintain any selected temperature in one or more of the compartments even though the cooling means is in operation.

Another object is to provide a space heating means comprising a radiator and separate valve means, in series, for controlling the flow of steam to the radiator, each of the valve means being under separate thermostatic control.

Another object is to provide means for rendering all of the heating and cooling means ineffective when the system is used merely as a ventilating means.

Another object is to provide means for protecting the several spaces against freezing temperatures when the air-conditioning system is not in use.

Another object is to provide means for stopping the flow of heating medium to all of the spaces when the cooling system is in operation.

Another object is to provide means for furnishing a protective supply of heat to the spaces when the source of electric power for the controlling system is temporarily removed, or fails for any reason.

Another object is to provide an improved electric control system for a plurality of cooperating temperature-regulating devices.

Other objects and advantages of this invention will be more apparent from the following detailed description of certain approved forms of apparatus assembled and cooperating according to the principles of this invention.

Figure 1:
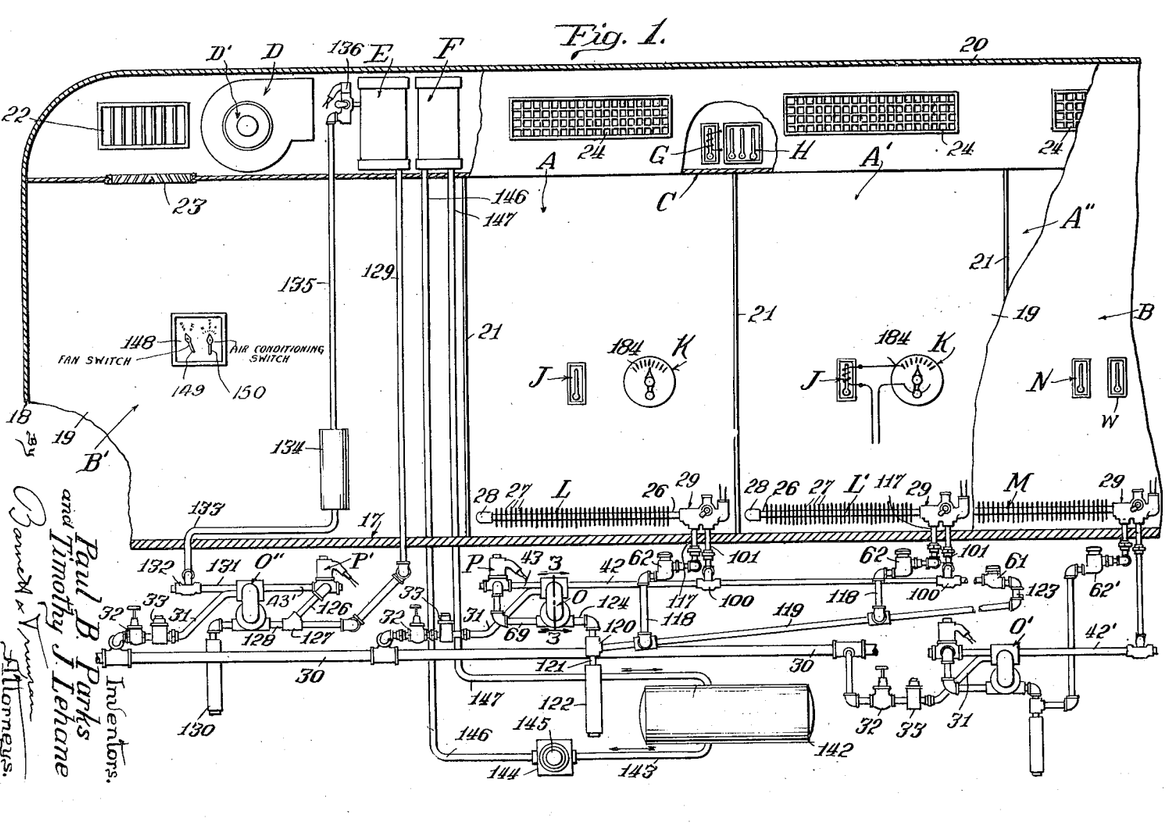
Fig. 1 is a diagrammatic elevation of a portion of a railway car furnished with this improved heating and air-conditioning apparatus, with parts broken away to indicate different portions of the car and the location of various units of the system.

Referring first to Fig. 1, the car structure is indicated by the floor 17, end and side walls 18 and 19, and top 20. The space within the car is divided by partitions 21 so as to provide a series of separate compartments, such as indicated at A, A' and A''. It will be understood that there may be a much larger number of these compartments than here shown by way of example. At B is indicated a portion of a passageway which may extend longitudinally substantially the length of the car either centrally or at one side thereof. The space B' at the left hand end of Fig. 1 may represent a part of the passageway B, or it may be some separate public room or storage space. The overhead air-circulating and distributing conduit C extends substantially the length of the car, and in the left-hand end portion of this conduit are located the blower or fan D, the heating radiator E and the cooling radiator F. The fan D is driven by motor D' and draws in outside air through the inlet passage 22 or return air from the car through passage 23, or a mixture of both, it being understood that suitable valve-regulating means (not here shown) will be used to control the valves or dampers 22 and 23. The air thus drawn into conduit C will be forced through or in contact with the radiators E and F and the tempered air will be discharged into the several compartments A, A', etc., through the several outlets or delivery ducts 24. At a suitable location in the air-conduit C are positioned the control thermostat G for the overhead heating system, and the thermostats H for the cooling system. In each of the compartments A is positioned a controlling thermostat J and a manually operated rheostat K for selecting the temperature to be maintained in that particular compartment. These control devices J and K cooperate to select and maintain the required flow of steam to the compartment radiators L, L', etc.

The wiring connections between all of these parts are clearly explained in connection with Figs. 4, 5 and 13. The showing in Fig. 1 is principally for the purpose of locating these features with respect to the car structure.

While any suitable type of radiator might be used for these compartment heating systems, the preferred form of radiator L, as here shown, is of the "inner-feed" type (see Fig. 2) comprising a pair of concentric or coaxial pipes 25 and 26, the outer pipe 26 being provided with a plurality of radiating fins 27 and being closed at one end by a cap member 28. Steam flows from the radiator inlet-valve 29 (hereinafter described) into and through the inner pipe 25 to the open end of this inner pipe adjacent the cap 28, and thence flows back through the outer annular space 26' between the pipes 25 and 26 to another chamber in valve 29, from which the condensate and non-condensable gases flow out. The fins 27 provide additional radiating surface to distribute the heat from the steam in pipe 26.

A similar radiator M is provided in passageway B, although the radiator M may be much longer than one of the radiators L. This radiator M is automatically controlled by the thermostat N, as will be hereinafter apparent.

The steam for the several heating systems is supplied from a suitable source which, in the present example, is the usual steam train-pipe 30 extending throughout the length of the car and connecting in series with similar pipes on other cars so as to form a conduit extending from the main source of supply at the locomotive.

The heating system, or plurality of cooperating systems, for the several individual compartments A, A', etc., will first be described, this heating system being of the controlled volume type disclosed more in detail and claimed in the patent to Parks and Stenzel, No. 2,271,778, granted February 3, 1942. Attention is now directed to the assembly of apparatus shown directly below the compartment A. The steam in supply pipe 30 will usually be at a rather high pressure, for example 250 pounds. A branch supply pipe 31 leads from train-pipe 30 to the main inlet port of the steam-regulator O. In this pipe 31 is located a main cut-off valve 32 which will normally be open, and a reducing valve 33 adapted to materially reduce the pressure of the steam supply to the regulator O, for example to about 20 pounds per square inch. In order to have this regulator O operate to the best advantage it is desirable not to supply steam thereto at too high a pressure and for this reason the reducing valve 33 is interposed between the main steam source and the regulator.

Figures 2, 3:
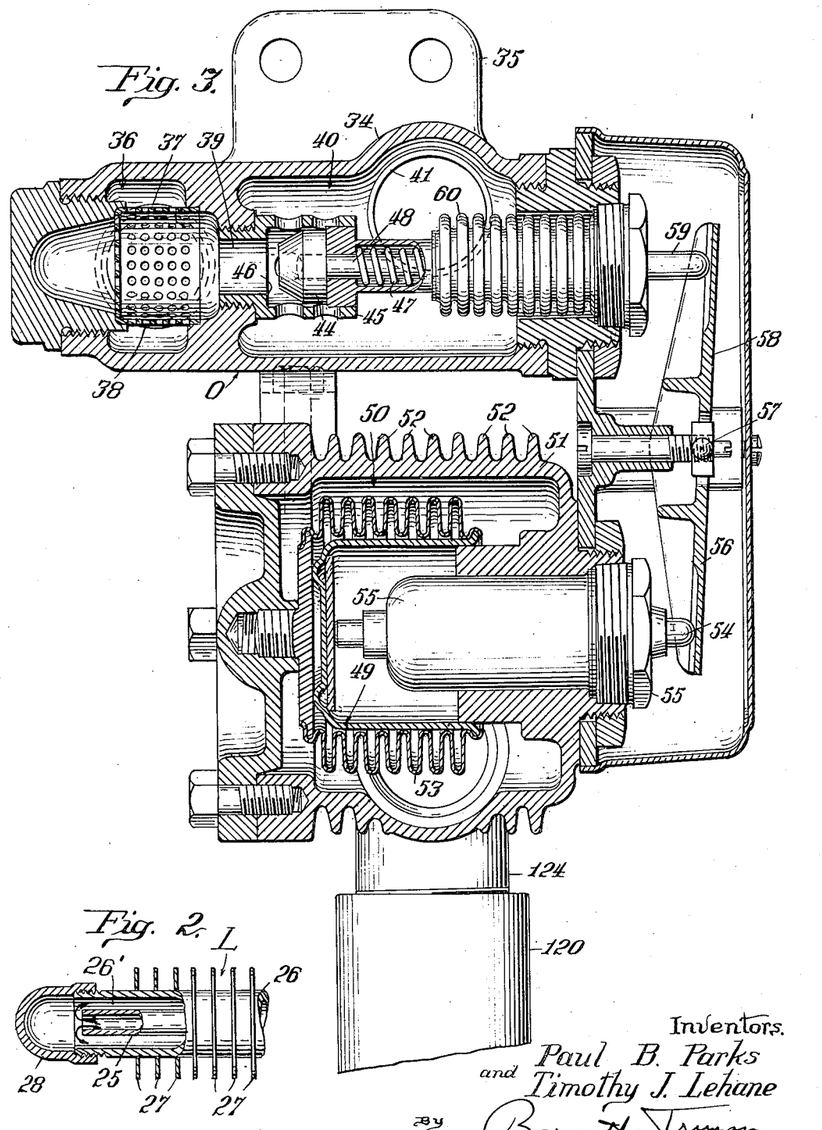
Fig. 2 is an elevation of a portion of one of the radiators, with parts in section.
Fig. 3 is a vertical longitudinal section through one of the steam-regulators, this view being taken substantially on the line 3—3 of Fig. 1, but on a larger scale.

The steam-regulator O operates similarly to so-called "vapor regulators" already known in the art, except that this regulator is preferably much more delicate in its operation so that the main control valve, which in the ordinary "vapor regulator" is moved abruptly from a fully closed to a fully open position, may be adjusted to selected partially closed positions so as to modulate or reduce the steam flow through the regulator without entirely opening or closing the valve. The improved regulator as partially shown in Fig. 3 is substantially of the type disclosed and claimed more in detail in the patent to Parks and Peterson, No. 2,238,369, granted Apr. 15, 1941. For the present purposes this regulator may be briefly described (see Figs. 1 and 3) as comprising a casing 34 supported by a suitable bracket 35 and formed with an inlet chamber 36 into which steam flows through port 37 from the supply pipe 31. Steam flows from inlet chamber 36 through strainer 38 and passage 39 into the outlet chamber 40 and thence through port 41 into the inlet end portion of supply pipe 42, from which the radiators L, L', etc., are supplied with steam. Steam also flows from outlet chamber 40 through a second port similar to 41 but disposed in the opposite wall of the chamber, and thence through pipe 43 (Fig. 1) into the pressure-limit valve P, hereinafter described. The movable valve member 44 is guided in cage 45 so as to engage and cooperate with the valve seat 46 at the outlet end of passage 39 to cut off the flow of steam from inlet chamber 36 into outlet chamber 40. The spring 47 surrounding valve stem 48 tends to move valve 44 toward the open position shown in Fig. 3.

A thermostatic member indicated generally at 49 is housed in a chamber 50 formed in a separate casing 51 provided with a plurality of outside radiating ribs 52 so as to expedite the lowering of the temperature around the thermostatic member when steam is no longer admitted to the thermostat chamber 50. Thermostatic member 49 comprises an outer bellows diaphragm 53 and contains a quantity of heat-responsive fluid so that when the thermostatic member is directly exposed to steam it will expand, thereby forcing outwardly (to the right Fig. 3) the stem 54 which projects through a sealing member 55 and engages at its outer end with the lower arm 56 of a lever pivoted adjustably intermediate its length at 57. The upper arm 58 of this lever is adapted to engage and push inwardly (toward the left Fig. 3) the stem 59 which projects into sealing member 60 and is adapted to engage valve-stem 48 and force the valve 44 toward its seat against the opposition of spring 47.

In the usual vapor-regulator as used in an ordinary vapor heating system, after the radiating system has been filled with steam, the excess steam will flow back through a return pipe into the chamber housing the thermostatic member and thereby close the valve so as to cut off further flow of steam into the radiating system. In the present improved system, steam and other fluid fuel returned from the radiating system or systems do not flow back into thermostatic chamber 50 but are separately disposed of, as hereinafter described. In the present improved system the outlet ends of the supply pipe 42 and the several individual radiating systems are not directly open to the atmosphere but on the contrary the outflow of steam is substantially prevented by the retarding devices or traps 61 and 62, respectively. As a consequence, as further steam is admitted from the source of supply to pipe 42 through the regulator O, the pressure of the steam in this supply pipe 42 and also in the supply chamber 40 of the regulator will be built up. At the same time, steam at this same increased pressure will flow from chamber 40 of the regulator through pipe 43, into the pressure limit valve P, shown more in detail in Figs. 11 and 12.

The improved pressure-limit valve P (see Figs. 1, 11 and 12) comprises a main casing 63 formed at opposite ends and at one side with three alternative threaded ports 64, 65 and 66, all leading into or from the steam chamber 67. In the example here shown, pipe 43 is threaded into the port 65. The other two ports 64 and 66 are closed by suitable plugs 68. Alternatively, this pressure-limit valve might be inserted midway the length of the pipe without interfering with the free flow of steam through the pipe and chamber 67, in which case the two sections of the pipe would be connected in the opposite pair of ports 64 and 65. The pipe 69 leads from the outlet port 70 of the upper steam chamber 71 (Fig. 12), thence down into the thermostat chamber 50 of the steam-regulator O. The upper chamber 71 of limit valve P is separated from the lower steam chamber 67 by the web 72. A cage structure 73 is threaded at its lower end 74 in a vertical passage formed in web 72, this cage having a central passage 75 partially closed at its lower end by the perforated strainer 76 and formed at its upper end with valve seat 77. Open passages 78 in the sides of cage 73 permit steam to flow from passage 75 into the upper steam chamber 71 and thence out through pipe 69. The valve 79 which cooperates with valve seat 77 is carried by valve stem 80 slidable through guide plug 81 mounted in the upper end of cage 73.

Figures 6, 7, 8, 9, 10, 11, 12:
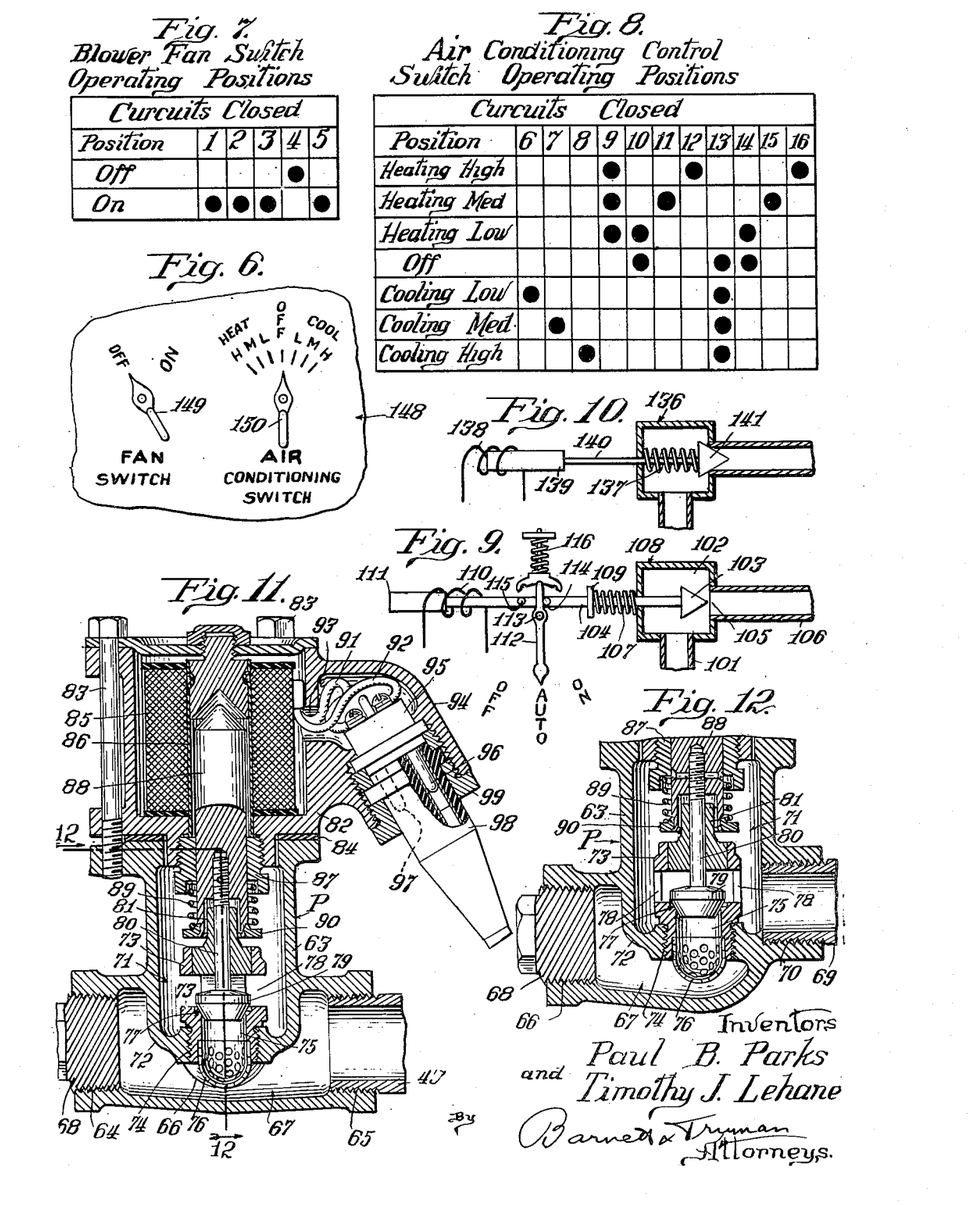
Fig. 6 is an elevation of a portion of the panelboard of the control system to show the "fan" and the "air-conditioning" switches.
Fig. 7 is a chart illustrating the positions of the individual switches 1 to 5 inclusive corresponding to the two positions of the fan switch.
Fig. 8 is a chart illustrating the positions of the switch contacts 6 to 16 inclusive corresponding to the seven different positions of the air-conditioning switch. The positions in the control circuits of the various circuits 1 to 16 inclusive are shown in Figs. 4 and 5.
Fig. 9 is a diagrammatic representation of one of the electrically-closed radiator inlet valves.
Fig. 10 is a similar view of the electrically-opened radiator inlet valve for the "overhead" heating or air-conditioning system.
Fig. 11 is a central vertical section through one of the pressure-limit valves.
Fig. 12 is a transverse vertical section through the pressure-limit valve, this view being taken substantially on the line 12—12 of Fig. 11.

The upper end of valve casing 63 is closed by the solenoid-casing 82 clamped in place by screw bolts 83 against the interposed gasket 84. The casing 82 encloses the solenoid coil 85 surrounding the guide-tube 86 held in place at its lower end by the nut 87 threaded into the end portion of casing 82. The upper end of valve stem 80 is secured in the solenoid core 88 slidable in guide tube 86 and pulled up, to open the valve, against the tension of spring 89 when the solenoid is energized. Spring 89 is confined between the nut 87 and the outstanding flange 90 at the lower end of core 88. The circuit wires 91 and 92 extending from the respective ends of coil 85 project out through passage 93 into a side extension 94 of casing 82 and connect with the electric terminal member 95 having plugs 96 and 97 projecting downwardly therefrom. The outer electric plug member 98 has sockets to receive the terminals 96 and 97 and is held in place within casing extension 94 by the removable nut 99.

The strength of spring 89 will be so selected or adjusted that the valve 79 will be held down against seat 77 until a predetermined steam pressure, for example about five pounds, is built up in the lower steam chamber 67, which pressure will correspond with the pressure in outlet chamber 40 of the steam regulator O, and also the pressure in the radiator supply pipe 42. As the steam pressure rises above this predetermined pressure the valve 79 will be lifted from its seat against the opposition of spring 89 so as to admit steam into the upper chamber 71 from which chamber this steam will flow through pipe 69 into the thermostat chamber of the vapor-regulator O. The spring 89 is of such a type that the spring-load will increase rapidly as the spring is compressed, consequently the valve 79 will only be lifted slightly from its seat so as to permit only restricted flow of steam through the conduit hereinabove described to the thermostat chamber of the regulator. As a consequence the thermostatic bellows will only be slightly expanded so as to only partially close the main valve 44 of the regulator and decrease the flow of steam into chamber 40 and supply pipe 42. The parts will quickly assume a balanced position in which valve 44 is only open to an extent sufficient to admit enough steam to keep up the desired steam pressure (for example five pounds per square inch) in the supply pipe 42. Obviously, as a greater or lesser number of radiators L are supplied with steam from pipe 42, the volume of steam admitted to this supply pipe must be increased or decreased, and a rebalancing of the regulator O will be necessary each time a radiator is put in or out of service. Since the electrically controlled valves 29 are rather frequently opened and closed by the thermostatically controlled means hereinafter described, it will be apparent that a more or less constant rebalancing of regulator O is required in order to control the volume of steam available in supply pipe 42 at the selected relatively constant low pressure, for example five pounds. However, since none of the return fluids, at low pressure, are returned to the regulator O, as in the ordinary vapor heating system, the required balance in regulator O is much more accurately and simply maintained since all of the steam which controls the expansion of the thermostatic bellows 53 comes directly from the supply chamber 40 through the pressure limit-valve P.

It will now be apparent that as long as the solenoid 85 remains deenergized, the valve 79 of the pressure-limiting device P will remain closed until the desired maximum pressure has been built up in the supply pipe 42. The valve 44 of the steam regulator O will remain open and steam will flow into the supply pipe 42 and the radiating system until the pressure in these pipes reaches the desired maximum, whereupon this pressure will open the pressure-limit valve 79 and permit steam to flow to the thermostatic chamber of the regulator, thus cutting off or at least decreasing the flow of steam into the supply pipe 42, but sufficient steam will always be admitted to maintain this desired low pressure of, for example five pounds. However, as soon as solenoid 85 is energized, the valve 79 will be lifted against the opposition of spring 89 so as to permit a free flow of steam from the upper chamber 40 of the steam regulator O to the lower thermostatic chamber 50 (through the limit valve P and its pipe connections), thus closing the valve 44 of the regulator and cutting off at the source the further supply of steam to the radiating systems.

One of the individual radiating systems will now be described, it being understood that there will be one of these systems for each separate compartment A of the car, and as many as six or more of these separate systems can be individually supplied with steam from the same supply pipe 42. Steam from pipe 42 flows through the water-seal 100 and riser 101 to the radiator inlet valve 29. The water-seal 100 is shown more in detail and claimed in the Patent No. 2,271,778 referred to hereinabove and need not be further considered in the present application.

The inlet valve 29 is disclosed in detail and claimed in the copending application of Parks and Peterson, Serial No. 335,719, filed May 17, 1940. This valve is indicated diagrammatically in Fig. 9 of the present application and comprises a steam supply chamber 102 into which the steam from supply pipe 42 flows through riser 101. The movable valve member 103 carried by valve stem 104 is adapted to close the port 105 through which steam flows from chamber 102 through pipe 106 into the inner pipe 25 of the radiator L (see Fig. 2). The compression spring 107 confined between one end of casing 108 and a collar 109 on valve stem 104 tends to move the valve 103 outwardly or toward the left (Fig. 9) so as to open the valve. When the solenoid 110 is energized, it will draw in the core 111 at the outer end of valve stem 104 and thus move valve 103 to closed position. It will be noted that this type of valve is normally open but is only closed when the solenoid 110 is energized. Hence this valve will automatically close whenever the electric power is cut off or fails. Means is also provided for operating this valve manually. As here diagrammatically shown, the operating lever 112 intermediately pivoted at 113, will normally be in the vertical position now shown (Fig. 9) in which position a free control of the valve by the solenoid and spring is permitted. If this lever 112 is swung in a clockwise direction to the position indicated on the dial as "off," the upper end of the lever will engage a pin or projection 114 on valve stem 104 and move the valve to closed position. On the other hand, if the lever 112 is swung in a counter-clockwise direction to the "on" position, the upper portion of the lever will engage another pin 115 and hold the valve in the open position to which it has been moved by spring 107. The lever and valve will be automatically locked in any one of the positions by the spring actuated locking device, indicated generally at 116. The electrical connections for controlling the solenoid 110 will be described hereinafter. This solenoid is under the control of the thermostat J and in turn the functioning temperature of this thermostat is controlled by the rheostat K which may be set by the occupants of the compartment A.

The condensate and other fluids returned from radiator L flow down through pipe 117, trap 62 and pipe 118 into the return main 119 connecting at 120 into the drip-pipe 121 which is open at its lower end to the atmosphere and is insulated at 122. Condensate and excess fluids flowing from the end of supply pipe 42 pass through trap 61 and thence through pipe connection 123 into return main 119 and thence as just described through the drip-pipe 121. Condensate from the thermostat chamber 50 of the regulator O flows out through pipe 124 and connection 120 into the drip-pipe 121. It will be noted that none of the condensate or non-condensable gases from the radiating system or from supply pipe 42 are returned to the thermostat chamber of the vapor regulator, but all of this condensate is dissipated through the drip-pipe.

The steam-retarders or traps shown at 61 and 62 may be of well known type comprising a thermostatic bellows adapted to expand in the presence of steam and close a valve. The trap 61 will prevent the outflow of steam from supply pipe 42 (except to the radiators when the valves 29 are open) so that the steam pressure in pipe 42 will build up to the maximum or limit permitted by valve P, after which the supply of steam will be cut down at the regulator O so as to be just sufficient to maintain this low pressure, for example five pounds, in the supply pipe 42. Similarly, when valve 29 is open, any excess steam that might tend to flow from radiator L through return pipes 117 and 118 will be stopped by the trap 62 so that only condensate and non-condensable gases are vented through this return system. There will be just sufficient steam passing the traps 62 at such times as these traps open to vent condensate, to keep the branch return pipes warm and prevent freezing. Preferably the retarder 61 at the end of the supply system will be formed with a small permanently open vent so that just sufficient steam will continuously flow through the return pipe 119 to prevent freezing of any liquids therein.

It has already been noted that several compartments A can be heated in this manner from the same steam supply system just described. For example, there may be six or eight of these compartments. If a greater number of compartments is to be heated a duplicate supply system can be provided independently furnished with steam from the train-pipe 30 and comprising its own regulator O, limit valve P, etc.

At the extreme right of Fig. 1 is indicated the heating system for the passage-way B. The inlet valve 29 and the radiator M may be the same as those previously described in connection with the compartments A, except that the radiator M will usually be longer than the radiators L for the smaller spaces. The steam supply mechanism disclosed in the lower right hand corner of Fig. 1 is substantially the same as that already described for compartment A. The only essential difference is that the steam supply pipe 42' extending from steam regulator O' may be much shorter since only a single radiator is supplied therefrom, and no return pipe, such as 119, will be necessary, nor need any retarder or trap 61 be used, but the end of supply pipe 42' is permanently closed. The trap 62' in the return from the radiator M is sufficient to keep up the required low steam pressure in the supply system. The temperature in the passage-way B is controlled from the thermostat N, but ordinarily this thermostat will not be regulated by a manual controller, such as K (as in the separately occupied compartments A) but will be set at a selected temperature by the primary control switches hereinafter described, in much the same manner as the overhead heat is controlled for the air-conditioning system. The same sort of heating system that is used for the passage-way could be used in other public rooms or spaces in the car, where control from a central station is more desirable.

The heating apparatus for the "over-head" air or air-conditioning system is indicated in and below the space B' at the left hand end of Fig. 1. It is desirable that the radiator E, when heat is required, shall be filled with steam quite quickly so that all portions of the air stream flowing in contact therewith shall be equally heated. This is also necessary since a "cycling" control system is used so that the steam supplied to this radiator is turned on and off at frequent intervals. For this reason, the supply system is so controlled that steam will first be provided under a considerable pressure for filling the radiator immediately, after which the pressure is allowed to drop to substantially atmospheric pressure and the system operates much the same as an ordinary vapor heating system. Steam flows, as before, from the source 30 through the cut-off and reducing valves into the steam regulator O". Steam flows from the regulator through pipe 43' into the pressure-limit valve P' which will be the same as the limit valve P, previously described, except that the valve P' will be set to maintain a higher supply of pressure, for example ten pounds to the square inch. When the pressure of the steam in the supply chamber exceeds this maximum and the valve P' opens, or when this valve is opened electrically, there will be a flow of steam through pipe 126, Y-fitting 127 and pipe 128 into the thermostat chamber of the regulator so as to cut down the steam supply from the source. It will be noted that in this case the return pipe 129 from radiator E also connects into the Y-fitting 127 and thence into the regulator O" so that the thermostat of the regulator can also be controlled by steam returned from the radiator, as in the usual vapor-heating system. All condensate and non-condensable gases are vented from the thermostat chamber of the regulator through the drip connection 130. The steam supply for radiator E flows from regulator O" through pipe 131, water-seal 132, pipe 133, reserve-tank 134, pipe 135 and inlet valve 136.

This inlet valve 136 is shown diagrammatically in Fig. 10, and is much the same as the valve shown in Fig. 9 except that this "over-head" control valve closes automatically by means of spring 137 but is opened eelctrically by solenoid 138. It will be noted that when this solenoid 138 is energized, it will draw in the core 139 at the outer end of valve stem 140 and thus open the valve 141 against the opposition of spring 137. This valve may also be provided with a manually operable opening and closing mechanism, such as is shown in Fig. 9. This valve is electrically controlled from the thermostat G through the connections hereinafter described.

It will now be noted that when inlet valve 136 is closed, steam will accumulate in the pipe connections between the regulator O" and valve 136 until a pressure of substantially ten pounds is built up, after which the limit valve P' will open and permit a flow of steam direct to the regulator and thus close or partially close the main control valve. The steam capacity of the supply piping, including the tank 134, is sufficient to hold enough steam under this fairly high pressure to quickly fill the radiator E when valve 36 is again opened. Obviously the pressure in this supply piping and in the radiator E will drop considerably as soon as the radiator is thus initially filled, and the limit valve P' will remain closed (unless electrically actuated). If more than enough steam is now supplied to fill the radiator E, steam will flow back through the return main 129 and enter the thermostat chamber of regulator O", thus cutting off the further flow of steam from the source. From this time on the system will operate the same as the usual vapor heating system, with steam at substantially atmospheric pressure, until inlet valve 136 is again closed, after which steam in the supply connections will again build up to the maximum pressure provided for. A heating system of this general type is disclosed more in detail and claimed in the patent to Parks, No. 2,274,736, granted March 3, 1942.

During the cooling season, cold water or other suitable fluid is supplied to the radiator F in any suitable manner. As here shown, a tank 142 suitably mounted beneath the car, contains a supply of water cooled by ice or a mechanical cooling system. When cooling is desired, cold water is drawn from tank 142 through pipe 143 by the pump 144 driven by motor 145, and then forced through pipe 146 into the radiator F. The water returns through pipe 147 to the tank 142 for further cooling. When no additional cooling is needed, the pump-motor 145 is stopped. This cooling system is controlled, through the electrical connections hereinafter described, from the thermostat or assembly of thermostats indicated at H in the air-conduit C.

A control panel 148 located at some convenient position in the car (Fig. 1) comprises a pair of manually operated control switches 149 and 150

(see also Fig. 6), the switch 149 controlling the fan or blower motor D' and being movable from an "off" position to an "on" position or vice versa. The air-conditioning switch 150 is movable from a central "off" position in a clockwise direction to three cooling positions, indicated as "low," "medium" and "high." Similarly, the switch can be moved from the off position in a counter-clockwise direction to low, medium and high heating positions. There are sixteen switch contacts within the panel that are controlled by these two main switches, these switch contacts being indicated by the numbers 1 to 16 inclusive on the wiring diagram of Figs. 4 and 5. As indicated in the chart of Fig. 7, when the fan switch 149 is moved to "off" position, only the switch contact 4 will be closed and switches 1, 2, 3 and 5 will be open. On the other hand, if the fan switch is moved to the "on" position, switches 1, 2, 3 and 5 will be closed, and switch 4 will be open. In a similar manner the positions of switches 6 to 16 inclusive are indicated on the chart of Fig. 8, in accordance with the positions to which the air-conditioning switch 150 is moved. When this switch 150 is in the central or "off" position, switch contacts 10, 13 and 14 will be closed and all other switches will be open. If the switch is moved to the "heating-high" position, switches 9, 12 and 16 will be closed and the other contacts open. Similarly, if the switch is moved to the "cooling-high" position, contacts 8 and 13 will be closed and the others open.

Figure 4:
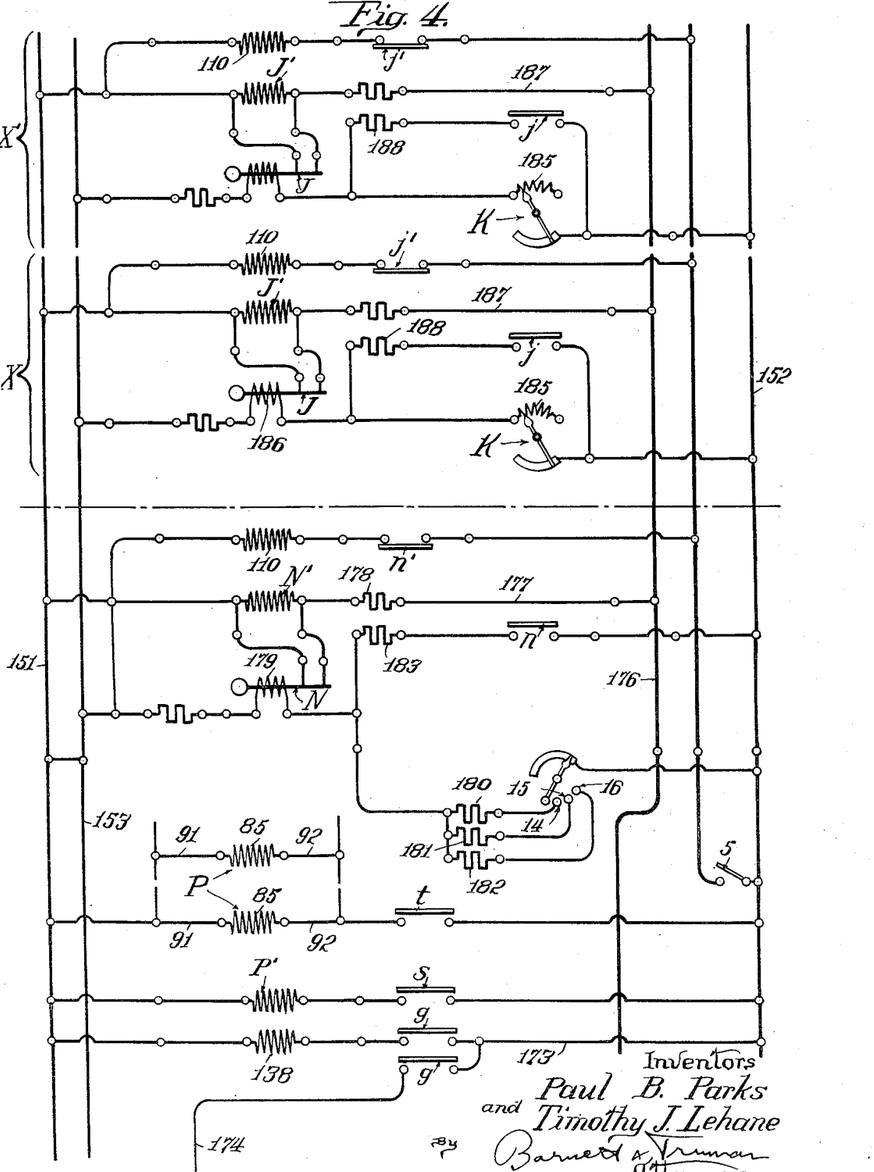
Figs. 4 and 5 show a wiring diagram of the control system, Fig. 5 being a downward continuation of Fig. 4. The circuit at the lower end of Fig. 4 is repeated at the top of Fig. 5 to facilitate the joint reading of these two figures.
Figure 5:
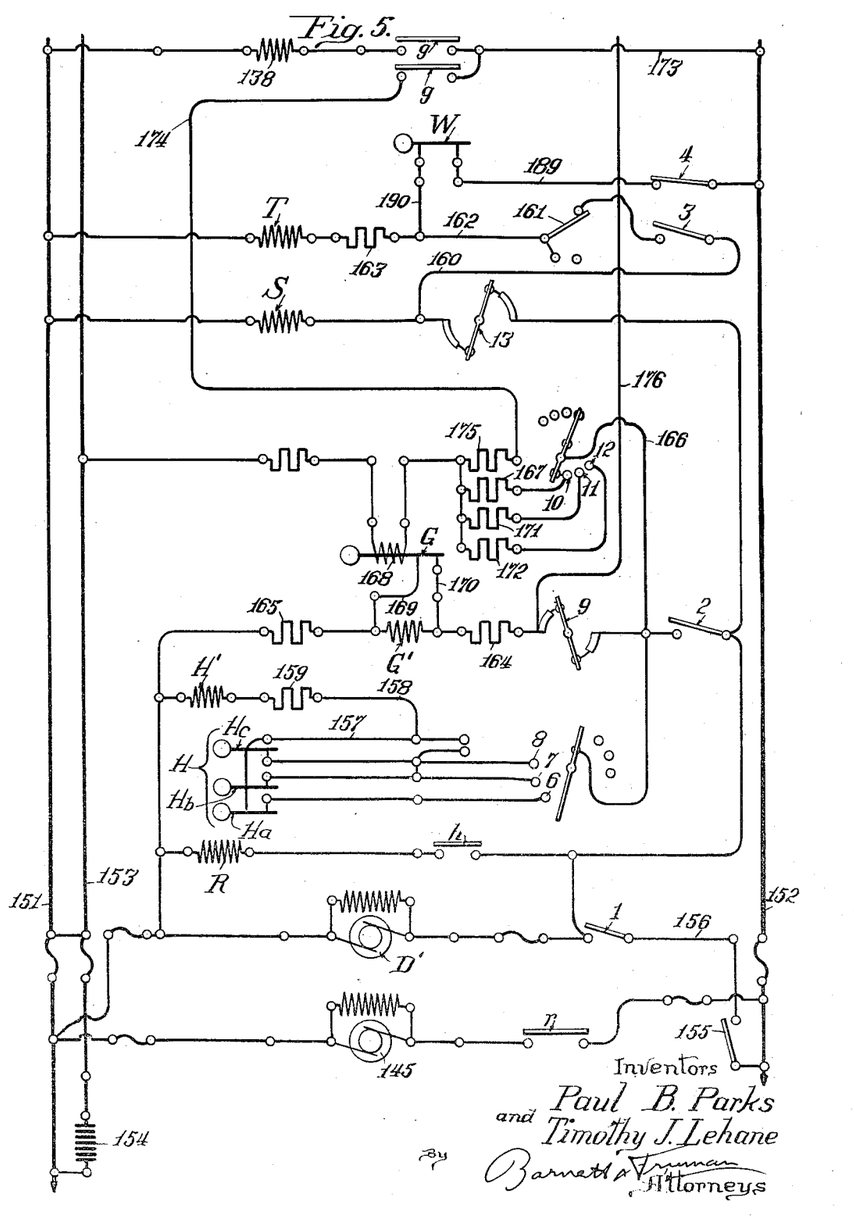
Figure 13:
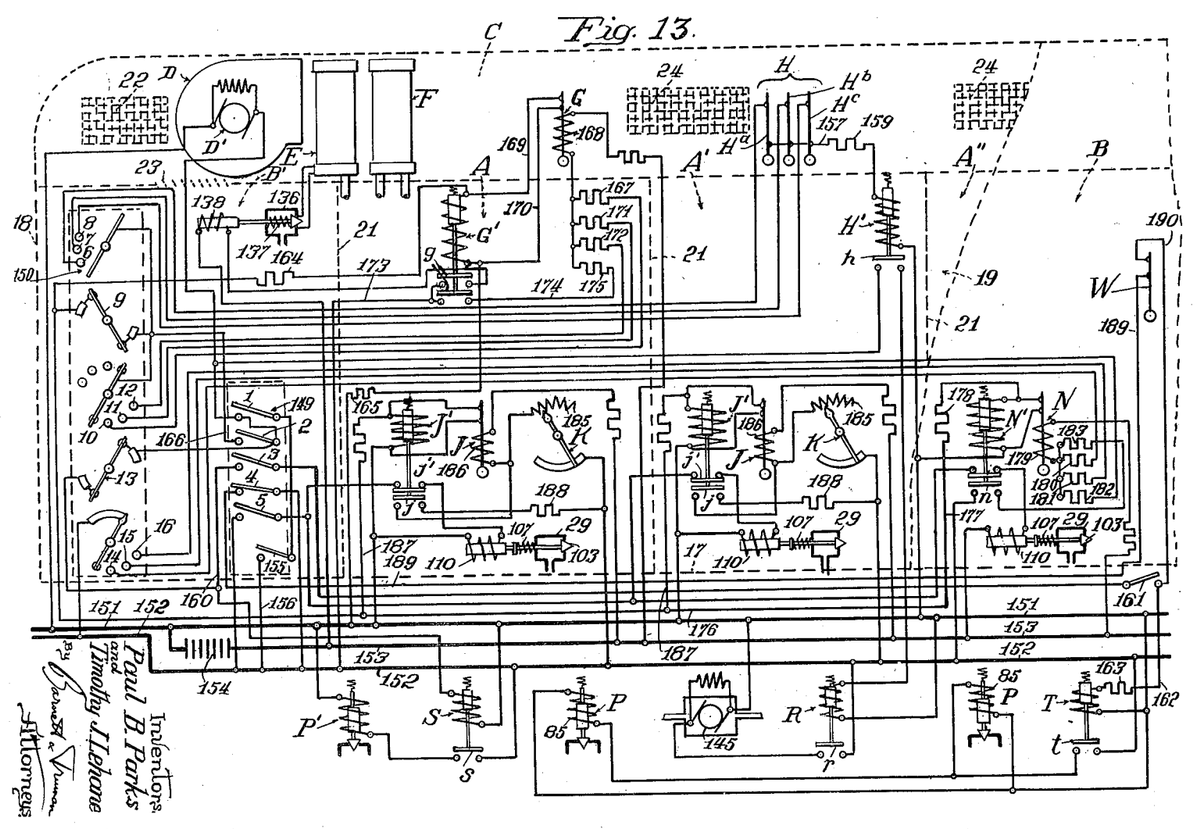
Fig. 13 is a view similar to Fig. 1 but consisting for the most part of a wiring diagram similar to Figs. 4 and 5 but indicating the several electrical mechanisms more completely.

Referring now to the simplified wiring diagram of Figs. 4 and 5, and the more complete diagram of Fig. 13, and more particularly to the lower portions of Figs. 5 and 13, the two outside power mains 151 and 152 extend from the terminals of the battery, or other suitable source of power. An auxiliary main 153 is connected through the lamp regulator 154 with main 151. It will be hereinafter noted that all of the electric heating circuits for adjusting the operating temperatures of the different thermostats are energized through the main 153, and for this reason the lamp regulator 154 is used in this circuit to maintain a substantially constant voltage, so that the selected operating temperatures for the thermostats will be more accurately maintained. The lighting switch 155 is connected in the partial circuit 156 extending from main 152 to the switch 1, and it will be hereinafter apparent that a great many of the control switches extend through this light switch 155 so that the greater portion of the circuits will not be operative until this main light switch is closed.

In the left-hand end portion of Fig. 13, the several individual switches of the manually operated switches 149 and 150 of panel 148 are shown in adjacent relation. The other portions of the electrical system are shown as nearly as practicable in those portions of the car where they are actually located.

The cooling system will first be described, the control circuit for the cooling system being shown assembled in the lower portion of Fig. 5. The three thermostats indicated at $H_a$, $H_b$ and $H_c$ are comprehended in the group of thermostats indicated at H in Fig. 1. The thermostat $H_a$ is adapted to complete its circuit and control the cooling-low circuit, and alternatively the thermostat $H_b$ will complete the cooling-medium circuit and $H_c$ controls the cooling-high circuit. Assuming that the "cooling-low" temperature is to be maintained, the fan switch 149 is moved to the "on" position and the air-conditioning switch 150 is moved to the cooling-low position. At this time the following switches will be closed: 1, 2, 3, 5, 6 and 13 (see Figs. 7 and 8). The closing of switch 1 will complete a circuit extending from power main 152 through light switch 155, through the blower or fan motor D' to the power main 151. This will place the blower in operation. The closing of switches 2 and 6 will complete a circuit extending to the thermostat $H_a$ and when the temperature in conduit C rises to the temperature for which this thermostat is adjusted, the circuit will be completed through the mercury column and through wire 157 and resistor 159 to the cooling-pilot relay H' and thence to power main 151. The energization of relay H' will close the relay contact h thus completing a circuit energizing the cooling control relay R. The energization of relay R will close the relay contact r (see bottom of Figs. 5 and 13) thus completing a circuit energizing the motor 145 of the cold-water pump. Cooling medium will now flow through the radiator F and the temperature of the air stream forced through conduit C will be lowered until the contact through thermostat $H_a$ is broken, following which the relays H' and R will be successively broken and the water pump will stop.

It may here be noted that in the mode of description hereinafter used a controlling thermostat has been indicated by an upper-case or capital letter, such as H, the corresponding relay has been indicated by the same capital letter primed, for example H', whereas a contact that is closed when the relay is energized is indicated by the small lower-case letter, for example h. In the event that there is a contact that is closed when the relay is deenergized, this contact is positioned below the corresponding fixed contacts and is indicated by the small letter primed (for example j', see top of Fig. 4).

Returning now to the cooling system, in the event that the air-conditioning switch is turned to either of the cooling-medium, or cooling-high positions, the respective switches 7 or 8 will be closed instead of the switch 6. When switch 7 is closed the thermostat $H_b$ will be in control, and when the cooling switch 8 is closed, the thermostat $H_c$ will be in control. In any case, the relay H' will be energized when the circuit through the relay is closed so as to start the cooling system in operation and lower the temperature in the air supply conduit C.

It will further be noted that when the control switch 150 is in any of the cooling positions, the switches 3, 5 and 13 will also be closed. A circuit will be completed through the switches 1 and 13 to energize the relay S (upper portion of Fig. 5 and lower portion of Fig. 13) and this relay will close the contact s (see lower portion of Fig. 4) so as to complete a circuit energizing the solenoid of pressure-limit valve P' of the overhead or air-conditioning heating system. As a consequence, the supply of steam to this over-head heating system will be cut off at its source by the action of the steam-regulator O". At the same time another circuit will be completed from switch 13 through wire 160, switch 3, emergency switch 161, wire 162, resistor 163, and relay T, the energization of this relay T closing the contact t (lower portion of Figs. 4 and 13) so as to energize the solenoid 85 of the pressure-limit valve P of the floor-heat system. This will shut off the supply of steam at the source to this floor-heat system, and it will be noted that in the event that there is more than one such floor-heat system, the several solenoids 85 can be connected in parallel, as indicated by the showing of two such solenoids in the lower portion of Fig. 4 and also Fig. 13.

It will also be noted that, as hereinafter described in detail with the switch 5 closed, all of the solenoids 110 of the several floor-heat inlet valves will be energized so as to hold these valves closed in opposition to springs 107 and thus further prevent the flow of steam to these heating radiators. Also, as will become apparent hereinafter, the solenoid 138 of the inlet valve 135 for the over-head radiator will be deenergized so that this valve will also be closed automatically by spring 137. Therefore, the supply of steam to all of the heating radiators will be cut off, not only at the entrance of the radiators but also at the source, whenever the cooling system is in operation, except for the emergency control hereinafter described.

During the "heating" season, the fan switch will be moved to the "on" position, as before, and the air-conditioning switch 150 will be moved to one of the three heating positions, either low, medium or high. Assuming first that this switch 150 is moved to the "low" heating position, the following switch contacts will be closed: 1, 2, 3, 5, 9, 10 and 14. This will control both the overhead or air-conditioning heat and the passageway heat to maintain the predetermined "low" temperature. First describing the over-head heat, the closing of switches 2 and 9 will complete a circuit through the relay G' and the resistors 164 and 165, and when this relay G' is energized it will close a pair of relay contacts g (see top of Fig. 5), one of these contacts completing a circuit energizing the solenoid 138 of the radiator inlet valve 136 so as to open this valve and admit steam to the radiator E. A circuit will also be completed through closed switch 2, wire 166 and switch 10 to and through the selected resistance 167, thence through the heating coil 168 applied to the thermostat G. The heat from heating coil 168 added to the heat imparted to the thermostat from the air stream in conduit C determines the temperature at which a shunt circuit through wires 169 and 170 will be closed around the relay G' so as to deenergize this relay and permit the relay contact g to open, thus deenergizing the valve solenoid 138 and permitting spring 137 to close the valve and cut off the further flow of steam to the radiator E.

For the other "medium" or "high" temperatures, the switches 11 or 12 will be closed instead of switch 10 so as to selectively include the resistances 171 or 172 in the circuit instead of the original resistance 167. These resistances 171 and 172 are progressively greater than the resistance 167 so that the heat imparted by the coil 168 to the thermostat G will be cut down and a higher temperature of the air in the conduit will be necessary to add to this auxiliary heat and cause the relay G' to be deenergized. In other words, the steam will be permitted to flow to radiator E for a longer time and the air stream temperature will be raised higher before the steam supply is cut off. Furthermore, still assuming that the low heat control is in operation, the closing of the other relay contact g by relay G' will complete another partial circuit (in parallel with the circuit through resistance 167) this circuit extending from main 152 through wire 173, lower contact g, wire 174 and resistance 175 to the heating coil 168. The two parallel paths for this heating circuit (through the parallel resistances 167 and 175) will permit a much larger current to flow through heating coil 168 so that the thermostat G will be quickly heated to the point where relay G' will be deenergized, and consequently the solenoid 138 will be deenergized and the steam supplied to the radiator E will be cut off. The instant the relay G' is deenergized, the lower contact g will also open so as to break the parallel circuit through resistance 175 and the normal lower temperature of heating coil 168 will again be restored. Consequently the temperature of thermostat G will quickly lower, provided the air in conduit C is still below the desired temperature, and the parallel circuits deenergizing relay G' will be broken and steam will again be admitted to the radiator E. This is what is known as a "cycling" operation of the thermostatic system so that the supply of steam to radiator E will be only continued for a short time, but the frequency with which these bursts of steam are supplied will increase as the demand for heat is greater, and will be less frequent as the need for additional heat decreases.

The passage-way heat controlling system will now be described, referring more particularly to the central portion of Fig. 4. This control system operates on much the same principle as the one just described for the "over-head" heat. With the parts in the position shown in the drawings, the passage-way is up to the desired temperature and thermostat N has completed a shunt circuit around the relay N' so that this relay is deenergized. At this time the relay contact n' will be closed and the solenoid 110 of the radiator inlet valve 29 will be energized through a circuit including the closed switch 5, relay contact n' and the solenoid 110. With the solenoid 110 energized, the valve 103 will be closed and no steam is being admitted to the radiator M. When the passageway temperature falls below the desired temperature, the shunt circuit will be broken through thermostat N and relay N' will now be energized through a circuit extending through closed switches 2 and 9, wire 176, wire 177, resistor 178, and relay coil N'. The relay contact n' will now open so as to deenergize solenoid 110 and permit spring 107 to open the valve and admit more steam to the radiator M. The temperature at which thermostat N will function is determined by the heat added to the thermostat by coil 179, and when switch 14 is closed (for the "heating-low" position of the air-conditioning switch) the resistance 180 will be included in the heating circuit which energizes heating coil 179. Similarly, if the switches 15 or 16 are closed instead of 14, the alternative resistances 181 and 182 will be substituted in the heating circuit so as to change the temperature at which thermostat N will function. When relay N' is energized and the steam is turned on at the radiator, the relay contact n will be closed so as to complete a parallel circuit through the cycling resistance 183, this divided circuit for the heating current permitting the current to be increased so as to provide a greater temperature at coil 179, thus quickly causing the thermostat N to close the shunt circuit around relay N' and deenergize the relay, thus cutting off the further flow of steam to radiator M. This cycling operation will continue as described for the "over-head" heat until the desired temperature is substantially reached in passage-way B.

At the top of Fig. 4 are indicated two similar control circuits (bracketed at X and X', respectively) for controlling two of the compartments or spaces A and A' as shown in Fig. 1. The same control circuits are also shown in compartments A and A' in Fig. 13. It will be understood that there will be a group of such circuits for each of the several compartments A, and a description of one will suffice for all. Each of these control systems operates much the same as the one for the passage-way B, as just described, except for the fact that instead of using three alternative resistances in the thermostat heating circuit (such as 180, 181 and 182 for the passage-way thermostat N) a single rheostat K is positioned in the compartment itself so that the occupant of the compartment can adjust this rheostat manually for any desired temperature, the scale of temperatures being indicated on a dial 184 (see Fig. 1). As shown in Fig. 4, the rheostat comprises a resistance 185 more or less of which is cut into the heating circuit as the rheostat is adjusted from within the compartment. In this manner the auxilary heat normally applied to thermostat J by the heater 186 is manually selected.

Assuming first that the compartment temperature is below the desired temperature for which rheostat K is set, the thermostat J will not complete the shunt circuit around relay J' and this relay J' will be energized through switches 2 and 9, and wires 176 and 187 to and through relay J' and thence to the main 151. Normally, when the compartment is heated to the desired temperature the solenoid 110 of the radiator valve 29 will be energized to close the valve through the circuit which is closed by switch 5. However, with relay J' energized, the relay contact j' (top of Fig. 4) will be open so that the valve solenoid 110 will be deenergized and this valve will be opened by the spring 107. Consequently steam is being admitted to the radiator L. However, at this time the relay contact j is closed so as to complete a circuit through the cycling resistance 188, this circuit being in parallel with the circuit through rheostat resistance 185, thus permitting an increased heating current to flow through the heating coil 186. Therefore, the thermostat J will quickly close the shunt circuit around the relay J' to deenergize this relay. The relay contact j' will immediatly close so as to energize the solenoid 110 and close the inlet valve and cut off the flow of steam to the radiator L. At the same time the relay contact j will open and break the shunt circuit through the cycling resistance 188, leaving only the rheostat resistance 185 in the heating circuit so that the thermostat J will respond directly to the temperature for which this thermostat is set to function by the manually operated rheostat K. Therefore, steam will be intermittently admitted to the radiator L, the frequency of these bursts of steam depending upon the difference between the prevailing space temperature and the temperature for which the system has been manually adjusted by rheostat K. It will be understood that the temperature of each of the compartments A is thus independently controlled, although the steam for a group of these compartments or spaces is obtained from the same supply pipe 42 in which the desired low steam pressure is kept substantially constant by the automatic control mechanism comprising the regulator O and limit-valve P, as already described.

It may now be noted that there are four general periods of operation that are possible with this apparatus: (1) The cooling period, (2) the heating period, (3) the ventilating period, and (4) the "out of use" period. The heating and cooling periods have already been generally described, but certain additional functions in these periods will now be referred to. It has already been noted that during the cooling period all heating systems have been rendered inoperative by cutting off the supply of steam at the source, since the closing of switches 13 and 3 energizes the relays S and T, thereby causing the solenoids of all of the pressure-limit valves to be energized, thus opening these valves and causing the regulators O to cut off the flow of steam to the different heating systems. However, it has been noted that a manually controlled "emergency" switch 161 is included in the circuit which energizes the relay T. Therefore, assuming that the cooling system is in operation, but switch 161 is manually opened, the relay T will be deenergized and the relay-contact t will open so as to deenergize the solenoids of the pressure-limit valves P which control the steam flow to the floor-heat systems. As a result steam can now flow to the inlet valves of the various compartment heating systems. However, the radiator inlet valves 29 will be closed since the solenoids 110 are energized through switch contacts 5 and j'. The switch 5 is closed by the air-conditioning switch 149, and contact j' is closed since the relay J' is not energized, the switch 9 being open during the "cooling" period (see Fig. 8). However, under these conditions the selected valve 29 can be manually operated by means of the mechanism shown in Fig. 9 so as to admit steam to any selected compartment. In this way heat can be furnished if desired or found essential to any selected compartment, even though the cooling system is being used in other portions of the car. If desired, dampers can be added to temporarily prevent the flow of cooled air into the heated space through the conduit outlet 24.

The "heating period" has already been generally described. It may also be noted that during this heating period the switch 13 is always open, therefore the relays S and T cannot be closed and the solenoids of the pressure-limit valves will always be deenergized and these valves will function only as "limit" valves and will not cut off the supply of steam at the source (that is, at the steam-regulators) so long as additional steam is needed to keep up the desired pressures in the different heating systems.

During the "ventilating period" the blower or fan switch 149 is turned to the "on" position, while the air-conditioning switch 150 is turned to the "off" position. At this time the following switch contacts will be closed: 1, 2, 3, 5, 10, 13, and 14. Under these conditions the steam supply will be cut off both at the radiator admission valves and at the pressure-limit valves and the cooling system will be inoperative since the selection switches 6, 7 and 8 are all opened by the air conditioning switch. The fan motor D' will be operative to cause a circulation of air through the spaces, but this air will be neither heated nor cooled.

During the "out of use period" the air conditioning switch may be left in any of its positions, but the fan switch 149 will be turned to the "off" position. At this time the switches 1, 2, 3 and 5 will all be open so that neither the overhead heating nor the cooling system will be operative, but at this time the switch 4 will be closed so as to complete a new circuit directly across the mains 151 and 152, this circuit comprising the switch 4, wire 189, thermostat W, wire 190, resistor 163 and relay T. The thermostat W is preferably positioned in the hallway B, adjacent one end of the car, where the lowest car temperature will probably be reached. When a car is "out of service" (and in fact much of the time when in service) the compartment doors will be left open and therefore the temperature in no compartment can normally fall lower than the temperature existing at the location of thermostat W. This thermostat is adapted to close the circuit therethrough at a comparatively low temperature, for example 50° F. As long as the car temperature is above 50° the circuit through this thermostat will be closed and the relay T will be energized to close the relay contact $t$ and thus energize the solenoids of the several pressure-limit valves P so as to cut off the supply of steam at the source. It will be noted that at this time all of the radiator inlet valves 29 will be open since the switch 5 is open and the radiator inlet-valve solenoids 110 are deenergized so that the valves are opened by the springs 107. If the car temperature at the location of the thermostat W falls below the desired minimum (50° F. for example) the circuit energizing the relay T will be broken and the relay contact $t$ will open so as to deenergize the solenoids of the limit valves P. At this time the pressure in the steam supply pipes will be below the limit so that steam will flow freely through the supply systems and through the open radiator inlet valves into the several radiators, thus quickly heating the car above the minimum temperature, after which thermostat W will again close the energizing circuit for relay T and as a result the pressure-limit valves will again be energized to cause the steam-regulators O to again cut off the supply of steam at the source. In this way the car spaces will not be permitted to fall below a desired minimum temperature. It will thus be seen that the so-called "floor-heating systems" are each normally under individual thermostatic control to maintain certain selected temperatures in the spaces heated by these systems, but when the manually controlled devices are so adjusted as to place the control systems "out of use" an auxiliary thermostatic control is provided to control these floor-heat systems and not permit the spaces to fall below a predetermined minimum temperature.

It will also be noted that if the electric power should fail for any reason, for example the battery should run down or the battery should be removed for replacement, the compartment steam-supply valves 29 will fail "open." This is because these valves are electrically closed. On the other hand, all of the other steam-controlled valves will automatically close when the current fails. Of course, all of the other electrically operated controls will be ineffective as long as the battery is removed or "dead." However, as long as steam is supplied to the car, the compartment supply valves will be open so that steam will be supplied automatically to the compartment radiators L whenever the current fails. The valves can then be controlled by the manually operable valve adjusting mechanism shown in Fig. 9.

We claim:

1. In means for heating a plurality of separate spaces, a heating means for each space including a radiator, an inlet valve for each radiator, means for normally holding the inlet valve open, thermostatically controlled means responsive to a rise in temperature within the space to a predetermined maximum for closing the valve, a source of steam, regulating means for stopping at the source the flow of steam to all of the radiators, thermostatic means for opening the regulating means when the temperature at a certain location falls below a predetermined minimum, and manually controlled means for rendering the first-mentioned valve-closing means inoperative when the last-mentioned thermostatic means is operative to open the regulating means.

2. Apparatus for heating a space comprising a radiator, a source of steam, a conduit connecting the source with the radiator, means controlling the flow of steam from the source to the conduit, said control means comprising pressure-actuated means for limiting the pressure in the conduit to a predetermined maximum, and also comprising electrically-actuated means for completely stopping the flow of steam to the conduit, a self-opening valve means for controlling the flow of steam from the conduit to the radiator, thermostatically actuated means for closing said valve means when a predetermined maximum temperature is reached in the space, and manually controlled means for opening or closing said valve means independently of the thermostatic control.

3. Apparatus for heating a space comprising a radiator, a source of steam, a conduit connecting the source with the radiator, means in the conduit to limit the flow of steam from the source so as to maintain a predetermined steam pressure in the conduit, electrically actuated means for making the last mentioned means effective to completely cut off the flow of steam from the source to the conduit, thermostatically actuated means for opening said cut-off means when the temperature in the space falls below a predetermined minimum, and a second means in the conduit adapted to automatically stop the flow of steam from the conduit to the radiator when a predetermined maximum temperature is reached in the space.

4. Apparatus for heating a space comprising a radiator, a source of steam, a conduit connecting the source with the radiator, means in the conduit to limit the flow of steam from the source so as to maintain a predetermined steam pressure in the conduit, electrically actuated means cooperating with the last mentioned means to completely cut off the flow of steam from the source to the conduit, and means in the conduit adapted to automatically stop the flow of steam from the conduit to the radiator when a predetermined maximum temperature is reached in the space, and means for manually opening or closing said last-mentioned cut-off means regardless of space temperature changes.

5. Apparatus for heating a space comprising a radiator, a source of steam, a conduit connecting the source with the radiator, means in the conduit to limit the flow of steam from the source so as to maintain a predetermined steam pressure in the conduit, electrically actuated means cooperating with the last mentioned means to completely cut off the flow of steam from the source to the conduit, thermostatically actuated means for opening said cut-off means when the temperature in the space falls below a predetermined minimum, means in the conduit adapted to automatically stop the flow of steam from the con- -duit to the radiator when a predetermined maximum temperature is reached in the space, and means for manually opening or closing said last-mentioned cut-off means regardless of space temperature changes.

6. Means for heating a space comprising a radiator, a source of steam, means for supplying steam from the source to the radiator comprising a pair of separate valve means in series between the source and radiator, separate thermostatically controlled actuating means for each valve means, and manually controlled selecting means for alternatively and cooperatively utilizing said valve means so that normally the valve means adjacent the source will control the flow of steam to maintain a predetermined supply pressure to the radiator, and the valve means adjacent the radiator will be open until the space temperature rises above a selected maximum after which this latter valve will be closed, but alternatively the valve adjacent the radiator is left open and the first-mentioned valve is normally closed but will be opened when the space temperature falls below a predetermined minimum.

7. Means for regulating the temperature within a plurality of spaces comprising means for individually heating each space to a temperature selected for that space, said heating means including a radiator, a supply valve for controlling the flow of heating medium to said radiator, thermostatically controlled means responsive to temperature changes in the space for actuating said valve to maintain a selected temperature in the space, means for cooling the spaces to a selected temperature, additional valve-means effective when the cooling means is in operation for cutting off the flow of heating medium to all of the radiators, emergency means for rendering said last-mentioned cut-off means inoperative, and means for manually controlling each of the first-mentioned individual valves when the cut-off valve is thus rendered ineffective, so that the temperature may be raised in the selected space.

8. Means for regulating the temperature within a plurality of spaces comprising means for individually heating each space to a temperature selected for that space, said heating means including a radiator, a self-opening valve for controlling the flow of steam to said radiator, thermostatically controlled electrically actuated means responsive to temperature changes in the space for closing said valve when a selected maximum temperature is reached in the space, means for cooling the spaces to a selected temperature, additional electrically controlled valve-means effective when the cooling means is in operation to cut off the flow of steam to all of the radiators, an emergency switch for deenergizing the last-mentioned valve means to permit a flow of steam to the radiators and individual means for manually controlling each of the first-mentioned valves so that the temperature can be controlled in a selected space.

9. Means for regulating the temperature within a space comprising ventilating means for circulating air through the space, means for either heating or cooling this circulating air to desired selected temperatures, means independent of the ventilating means for individually heating the air in the space, manually set electrically actuated control means for putting the ventilating means into or out of operation and rendering both the heating and cooling means ineffective when the ventilating means is out of operation, and means rendered operative only when the ventilating means is not operating for controlling the individual space heating means to prevent the space temperature from falling below a predetermined minimum.

10. Means for regulating the temperature within a space comprising ventilating means for circulating air through the space, means for either heating or cooling this circulating air to desired selected temperatures, means independent of the ventilating means for individually heating the air in the space, means for locking all heating means out of operation when the cooling means is operating, and manually set electrically actuated control means for putting the ventilating means into or out of operation and rendering both the heating and cooling means ineffective when the ventilating means is out of operation, and means rendered operative only when the ventilating means is out of operation for controlling the individual space heating means to prevent the space temperature from falling below a predetermined minimum.

PAUL B. PARKS.
TIMOTHY J. LEHANE.